C. HERMANN.
SOLDERING IRON ATTACHMENT.
APPLICATION FILED DEC. 23, 1912.

1,083,363.

Patented Jan. 6, 1914.

Witnesses:
T. Colson,
C. E. Wessels.

Inventor;
Carl Hermann,
By Joshua R H Potts
his Attorney.

UNITED STATES PATENT OFFICE.

CARL HERMANN, OF CHICAGO, ILLINOIS.

SOLDERING-IRON ATTACHMENT.

1,083,363. Specification of Letters Patent. Patented Jan. 6, 1914.

Application filed December 23, 1912. Serial No. 738,270.

*To all whom it may concern:*

Be it known that I, CARL HERMANN, a citizen of the United States, and a resident of the city of Chicago, county of Cook, and State of Illinois, have invented certain new and useful Improvements in Soldering-Iron Attachments, of which the following is a specification.

My invention relates to attachments for soldering irons and particularly to the class of such attachments adapted to feed solder to the soldering iron while in use.

The object of this improvement is to provide a device of the character mentioned which will be simple in construction and efficient in its operation.

Other objects will appear hereinafter.

The invention consists in the combinations and arrangements of parts hereinafter described and claimed.

Figure 1:
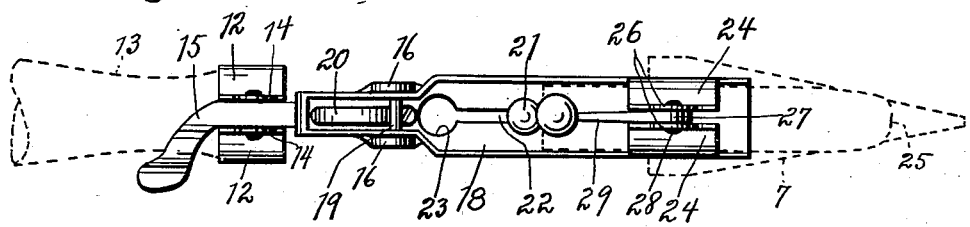
Figure 3:
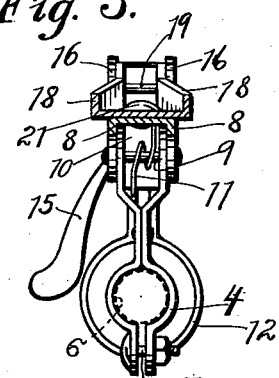
Figure 2:
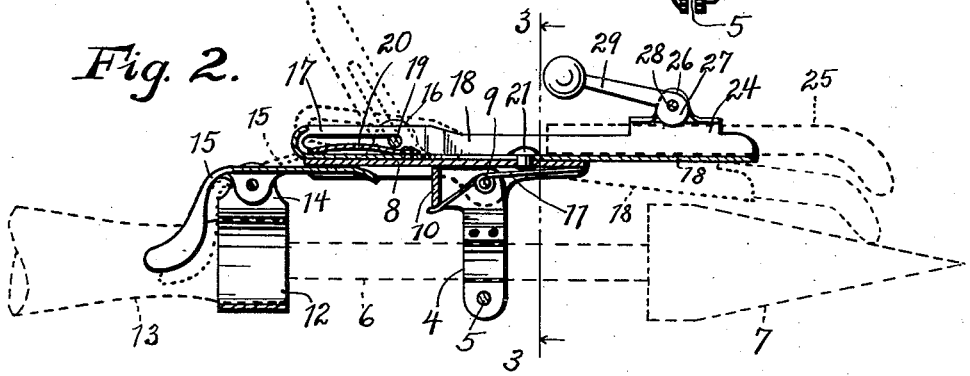

The invention will be best understood by reference to the accompanying drawing forming a part of this specification, and in which, Figure 1 is a plan view of an attachment embodying my invention, showing its application to a soldering iron, Fig. 2 is a longitudinal section of the same which also illustrates its application to the soldering iron, and Fig. 3 is a section taken on line 3—3 in Fig. 2.

The preferred form of construction, as illustrated in the drawing, comprises a clamping member 4 provided with a clamping bolt 5 which is adapted to be secured to the shank 6 of a soldering iron 7. The clamping member 4 is to be made in different sizes to fit different forms and sizes of shanks of conventional soldering irons now in use.

On the top end of member 4 is a frame 8 secured thereto by means of a pivotal connection 9. One side of the top end of the clamping member 4 is provided with a stop 10 against which the member 8 rests when in normal position. A spring 11 is coiled around the pivotal joint 9 and maintains the frame 8 in its normal position resting against the stop 10.
A second clamping member 12 is secured on the handle portion 13 of the soldering iron and provided with ears 14 to which is pivotally secured a manually operative lever 15 adapted to move the frame 8 on its pivotal point 9, as is clearly illustrated.

The frame 8 is provided with a pair of ears 16 to which is secured the slotted end 17 of a solder holder 18. A pin 19 extends through the ears 16 and slotted end 17 to form a pin-and-slot connection between the frame 8 and solder holder 18. An upwardly curved leaf spring 20 is secured to the inner side of the slotted end 17 of the solder holder 18 and is adapted to resiliently lock the pin 19 at either end of the slotted end 17 as will be clearly understood by referring to the drawings. A headed pin 21 is secured in the frame 8 and extended through a slot 22 in the solder holder 18 to normally lock the solder holder against the frame 8. At one end of the slot 22 is provided an enlargement 23 sufficiently large to permit the head of the headed pin 21 to pass through to permit the solder holder 18 to swing on its pivotal pin 19.

The forward end of the solder holder 18 is provided with arms 24 extending upwardly and curved toward each other to form a passage for a stick of solder 25 and at the edges of said arms 24 are provided ears 26 to which is pivotally mounted an eccentric 27 on a pin 28. An arm 29 is formed on the eccentric 27 to operate said ecentric to lock the bar of solder 25 in the solder holder.

In operation, the clamping member 4 is secured to the shank 6 of the soldering iron 7 and the manually operative lever 15 secured to the handle of said iron by means of its clamp 12 so that one end of the lever 15 will engage the under side of the frame 8 to move its engaging end upwardly. This upward movement of this end of the frame 8 causes the other end of said frame to move downwardly thereby causing the forward end of the solder 25 to contact the iron 7 and permit the solder to flow on to the solder iron. On a gasolene, alcohol, electric or other heating soldering iron it is not necessary to move the solder holder on the pin 19, but on irons heated by an outside source of heat, it is necessary to slide the solder holder 18 longitudinally of the frame 8 thereby allowing the pin 19 to slide over the spring 20 to the opposite end of its slot, and the pin 21 to slide to the opposite end of its slot where the head of pin 21 will pass through the opening 23 to permit the solder holder 18 to swing on said pin 19 to a position such as indicated by the dotted lines in

Fig. 2 to heat or reheat the soldering iron 7. When the iron is heated or reheated the solder holder is again moved on pin 19 until it contacts the frame 8 and slid to lock it in position when it is ready for use again. The lever 15 is designed to be moved by the front finger or a part of the hand near the front finger when gripping the handle 13.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having described my invention what I claim as new and desire to secure by Letters Patent is:

1. In combination, a soldering iron having a shank; a clamping member removably secured on the shank of said soldering iron; a solder holder pivotally secured on said clamping member; and a manually operative lever on said soldering iron adapted to move said solder holder on its pivotal point, substantially as described.

2. In combination, a support; a frame pivoted on said support; a solder holder on said frame; a slot and pin connection between said frame and said solder holder; a lock adapted to lock said solder holder on said frame; and means for moving said frame on its pivotal point, substantially as described.

3. In combination, a support; a frame pivoted on said support; a solder holder on said support; slot and pin connection between said frame and said solder holder; a lock for locking said solder holder on said frame; and a spring on said support for maintaining said frame in its normal position, substantially as described.

In testimony whereof I have signed my name to this specification in the presence of two subscribing witnesses.

CARL HERMANN.

Witnesses:
JOSHUA R. H. POTTS,
HELEN F. LILLIS.

---

Copies of this patent may be obtained for five cents each, by addressing the "Commissioner of Patents, Washington, D. C."